United States Patent
Feng et al.

(10) Patent No.: US 11,699,216 B2
(45) Date of Patent: Jul. 11, 2023

(54) AUTOMATIC FISHEYE CAMERA CALIBRATION FOR VIDEO ANALYTICS

(71) Applicant: NEC Laboratories America, Inc., Princeton, NJ (US)

(72) Inventors: Min Feng, Monmouth Junction, NJ (US); Srimat Chakradhar, Manalapan, NJ (US); Alper Yildirim, Atlanta, GA (US)

(73) Assignee: NEC Corporation

( * ) Notice: Subject to any disclaimer, the term of this patent is extended or adjusted under 35 U.S.C. 154(b) by 285 days.

(21) Appl. No.: 17/182,685

(22) Filed: Feb. 23, 2021

(65) Prior Publication Data
US 2021/0279845 A1   Sep. 9, 2021

Related U.S. Application Data

(60) Provisional application No. 62/986,897, filed on Mar. 9, 2020.

(51) Int. Cl.
G06T 5/00   (2006.01)
G06T 7/13   (2017.01)
G06T 7/80   (2017.01)

(52) U.S. Cl.
CPC ............... G06T 5/006 (2013.01); G06T 7/13 (2017.01); G06T 7/80 (2017.01); G06T 2207/10016 (2013.01)

(58) Field of Classification Search
CPC .. G06T 5/006; G06T 7/13; G06T 7/80; G06T 2207/10016
See application file for complete search history.

(56) References Cited

U.S. PATENT DOCUMENTS

| | | | |
|---|---|---|---|
| 8,368,762 B1* | 2/2013 | Chen | H04N 17/002 348/188 |
| 2011/0249153 A1* | 10/2011 | Hirooka | H04N 5/272 348/241 |
| 2016/0055629 A1* | 2/2016 | Jang | G06T 5/006 382/275 |
| 2019/0012766 A1* | 1/2019 | Yoshimi | H04N 23/60 |
| 2019/0043219 A1* | 2/2019 | Tezaur | H04N 23/698 |

FOREIGN PATENT DOCUMENTS

KR   101578029 B1   12/2015

OTHER PUBLICATIONS

Bukhari et al., "Automatic Radial Distortion Estimation from a Single Image", Journal of mathematical imaging and vision. Jan. 2013. vol. 45, No. 1. pp. 31-45.

(Continued)

*Primary Examiner* — Molly Wilburn
(74) *Attorney, Agent, or Firm* — Joseph Kolodka

(57) ABSTRACT

A computer-implemented method executed by at least one processor for reducing radial distortion errors in fish-eye images is presented. The method includes capturing an image from a camera including distortions, detecting arc-shaped edge segments in the image including the distortions, estimating a main distortion parameter by fixing a distortion centerpoint in a middle of the image, estimating the distortion centerpoint with the main distortion parameter, and obtaining an undistorted version of the captured image by inverting the distortion model.

18 Claims, 7 Drawing Sheets

(56) References Cited

OTHER PUBLICATIONS

Devernay et al., "Straight lines have to be straight: automatic calibration and removal of distortion from scenes of structured enviroments", Machine Vision and Applications. Aug. 2001. vol. 13, No. 1. pp. 14-24.

Wang et al., "A Simple Method of Radial Distortion Correction with Centre of Distortion Estimation", Journal of Mathematical Imaging and Vision. Nov. 2009. vol. 35, No. 3. pp. 165-172.

Changsheng Lu et al., "Circle Detection by Arc-Support Line Segments", 2017 IEEE International Conference on Image Processing (ICIP), Sep. 17, 2017, pp. 76-80 (see p. 77).

* cited by examiner $$E = \sum_{k=1}^{N} \left| \sum_{j=1}^{n_k} \frac{f(x_j, y_j; \lambda, x_o, y_o)}{d_k} \right|$$

FIG. 6

AUTOMATIC FISHEYE CAMERA CALIBRATION FOR VIDEO ANALYTICS

RELATED APPLICATION INFORMATION

This application claims priority to Provisional Application No. 62/986,897, filed on Mar. 9, 2020, incorporated herein by reference in its entirety.

BACKGROUND

Technical Field

The present invention relates to computer vision applications and, more particularly, to automatic fisheye camera calibration for video analytics.

Description of the Related Art

Fisheye lenses are becoming more and more ubiquitous in daily computer vision applications (surveillance, security, situational awareness). This is mostly because of their large Field-of-View (FOV). Because of this property, use of these cameras yields to a cheaper solution when compared to traditional camera systems as the whole scene can be monitored with a lesser number of cameras. However, there are certain disadvantages with fisheye cameras for intelligent video analytics. Since these cameras tend to distort the real shape of the scene, video analytics techniques that are designed for traditional pinhole cameras often perform poorly with these cameras. For example, traditional face detection algorithms perform poorly when the faces get close to the borders of the area being monitored. The reason is that radial distortion reaches a severe level near the borders that results in the observation of a twisted version of the true face. One solution is to compensate for this radial distortion in the footage and run the face detection algorithm on the compensated version of it. This compensation is done by a procedure referred to as camera calibration.

SUMMARY

A computer-implemented method executed by at least one processor for reducing radial distortion errors in fish-eye images is presented. The method includes capturing an image from a camera including distortions, detecting arc-shaped edge segments in the image including the distortions, estimating a main distortion parameter by fixing a distortion centerpoint in a middle of the image, estimating the distortion centerpoint with the main distortion parameter, and obtaining an undistorted version of the captured image by inverting the distortion model.

A system for reducing radial distortion errors in fish-eye images is also presented. The system includes a memory and a processor in communication with the memory, wherein the processor is configured to capture an image from a camera including distortions, detect arc-shaped edge segments in the image including the distortions, estimate a main distortion parameter by fixing a distortion centerpoint in a middle of the image, estimate the distortion centerpoint with the main distortion parameter, and obtain an undistorted version of the captured image by inverting the distortion model.

A non-transitory computer-readable storage medium comprising a computer-readable program is presented for reducing radial distortion errors in fish-eye images, wherein the computer-readable program when executed on a computer causes the computer to perform the steps of capturing an image from a camera including distortions, detecting arc-shaped edge segments in the image including the distortions, estimating a main distortion parameter by fixing a distortion centerpoint in a middle of the image, estimating the distortion centerpoint with the main distortion parameter, and obtaining an undistorted version of the captured image by inverting the distortion model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 is an equation for a cost function for automatic fisheye camera calibration for video analytics, in accordance with embodiments of the present invention.

DETAILED DESCRIPTION OF PREFERRED EMBODIMENTS

Camera calibration techniques are used to estimate intrinsic and extrinsic parameters of cameras which include radial distortion parameters. Extensive research on camera calibration has been performed and acceptable solutions have been provided when the camera and its calibration pattern are available. However, the issue gets tricky when a calibration pattern is not available. This is the case when video analytics solutions are deployed using customer-provided cameras. Calibrating a camera without a calibration pattern is known as autocalibration. This is also a well-researched issue where significant efforts have been made and complex techniques have become available. However, these methods mostly require some constraints on the camera parameters (e.g., fixed focal length, pure rotational motion, multiple images etc.). Also, the purpose of the exemplary embodiments does not pertain to a full calibration. Instead, the exemplary embodiments are focused on compensating for radial distortion only. As a result, the conditions required by autocalibration algorithms can be relaxed. The exemplary embodiments aim to develop a method which can uncover the radial distortion parameters and undistort the footage captured by that camera by using one image.

The cost function of the exemplary embodiments of the present invention is based on the fact that straight lines in nature are mapped into circular arcs when viewed from a fisheye lens. As a result, if the goal is to remove the radial distortion, the exemplary methods need to make sure that for the circular arcs the methods detect the area between the individual arc and its corresponding chord (that is, a straight line segment passing through both ends of that circular arc) should be made as small as possible. The exemplary embodiments define the sum of the areas remaining in between the circular arcs and their corresponding chords as the cost function. Obviously minimizing this area makes the arcs as straight as possible, and thus reduces radial distortion proportionately.

Figure 1:
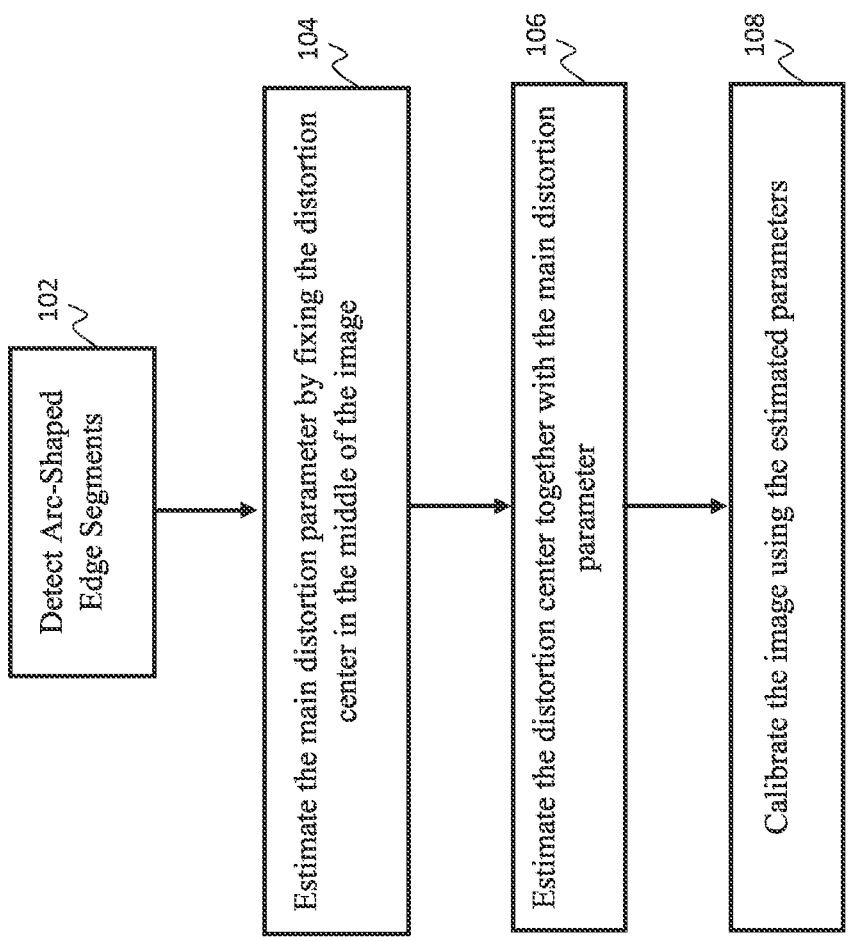
FIG. 1 is a block/flow diagram illustrating automatic fisheye camera calibration, in accordance with embodiments of the present invention.

FIG. 1 is a block/flow diagram illustrating automatic fisheye camera calibration, in accordance with embodiments of the present invention.

At block 102, detect the arc-shaped edge segments.

At block 104, estimate the main distortion parameter by fixing the distortion center in the middle of the image.

At block 106, estimate the distortion center together with the main distortion parameter.

At block 108, calibrate the image using the estimated parameters.

At block 102, straight lines are mapped into circular arcs with the barrel distortion caused by fish-eye lenses.

The procedure of detecting arc-shaped segments includes a series of steps, which include, e.g.:

First, edge detection is performed with an edge detection algorithm.

Second, connected pixel chains in the binary image created are found by edge detection.

Now a set of long connected pixel chains has been obtained and the next step is to find which one of these pixels chains has a circular form. The exemplary embodiments perform circle fitting on each of these chains. Note that the circle fitting process to a given set of points can be performed in closed form by expressing it as a linear-least-square (LLS) minimization on an algebraic error.

However, the parameter set obtained for each chain is meaningful only for the sets that have circular structure, and this is how the exemplary embodiments eliminate the connected pixel chains that do not form a circular arc. The exemplary embodiments substitute the pixel coordinates of each chain into its corresponding circle equation and determine how much each pixel deviates from its equation. For the chains with circular structure, a large percentage of these points are supposed to be at a small vicinity of their corresponding equation (a large inlier ratio). Therefore, the exemplary embodiments eliminate the chains that have a small inlier ratio.

At this point, the set of chains that remain are the ones that have a reasonable level of circularity. The exemplary embodiments also obtained their estimated parameter sets. Since the linear least squares (LLS) scheme for circle estimation is based on algebraic error, the exemplary embodiments refine the estimates for each chain with a nonlinear circle fitting algorithm. This is very robust as the exemplary method starts with a closed initialization to estimate the true parameter set.

Figure 2:
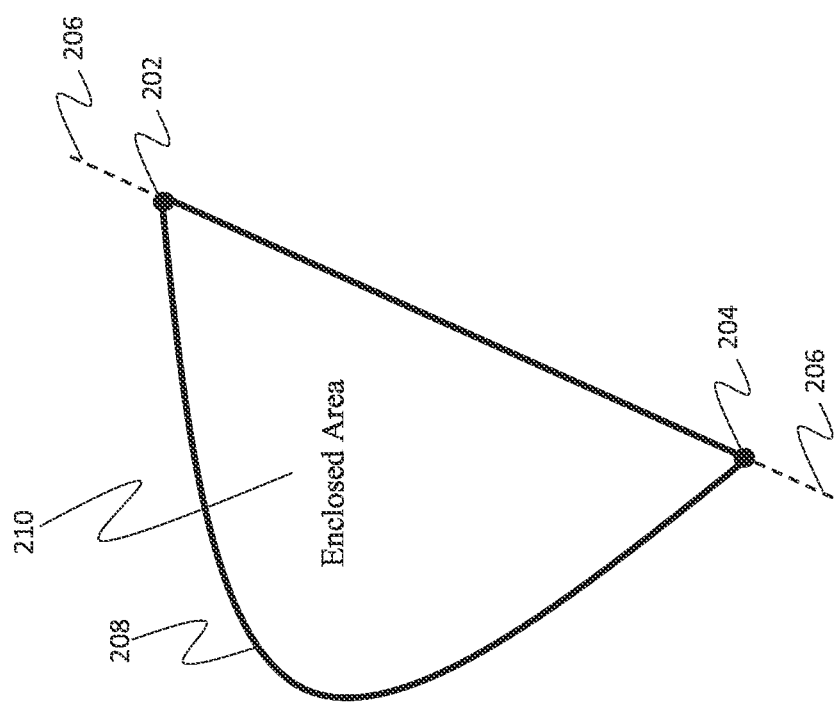
FIG. 2 illustrates distorted straight lines modeled as circular arcs, in accordance with embodiments of the present invention.

At block 104, distorted straight lines can be modeled as circular under the division model with parameters ($\lambda$, $x_o$, $y_o$). At block 104, the exemplary embodiments fix the distortion center ($x_o$, $y_o$) in the middle of the image and estimate the main distortion parameter $\lambda$. The goal is to remove the barrel distortion. The exemplary embodiments need to make sure that for the circular arcs that are detected, the area between the individual arc and its corresponding chord (a straight line segment passing through both ends of that circular arc) should be made as small as possible. FIG. 2 illustrates the area between an arc and its chord, and will be described below in detail. The exemplary embodiments define the sum of the areas remaining in between the circular arcs and their corresponding chords as the cost function.

The cost function can be calculated as follows:

For each detected arc, the chord passing through both endpoints of the arc is computed.

The, the distance from each pixel on the arc to the chord is computed.

The point-line distances for each arc are then summed. This is a scaled version of the area enclosed by the arc and chord.

For each arc, the distance sum is divided by the length of the chord to get a normalized error between the arc and the chord.

A squared sum of the normalized errors of all arcs is the cost function.

The cost function can be defined mathematically as follows:

$$E = \sum_{k=1}^{N} \left| \sum_{j=1}^{n_k} \frac{f(x_j, y_j; \lambda, x_o, y_o)}{d_k} \right|$$

where N is a number of the circular arcs in the image, $n_k$ is a number of pixels for $k_{th}$ arc, $d_k$ is a distance between the endpoints of $k_{th}$ arc, and $f(x_j, y_j, \lambda, x_o, y_o)$ is a signed distance between the point ($x_j$, $y_j$) and the chord under the set of distortion parameters of ($\lambda$, $x_o$, $y_o$).

To estimate the main parameter $\lambda$, the exemplary embodiments fix parameters $x_o$, $y_o$ in the middle of the image and run an optimization procedure by minimizing the error over the parameter $\lambda$. The exemplary embodiments can use the Levenberg-Marguard algorithm for the optimization.

At block 106, when the optimum A value is obtained, the exemplary embodiments run another optimization procedure on all three parameters ($\lambda$, $x_o$, $y_o$), where ($x_o$, $y_o$) are initialized as the image center and $\lambda$ is initialized with the value obtained from block 104. The exemplary embodiments can use the same Levenberg-Marguard algorithm for this optimization.

At block 108, the exemplary embodiments can use the optimum values of ($\lambda$, $x_o$, $y_o$) to undistort all images from the same camera assuming the focal length of the camera is not changing by inverting the distortion model.

FIG. 2 illustrates distorted straight lines modeled as circular arcs, in accordance with embodiments of the present invention.

The detected arc 208 includes two endpoints, that is, endpoints 202 and 204. An imaginary straight line or chord 206 passes through the end points 202 and 204. Thus, an area 210 is defined between the detected arc 208 and the chord 206. The goal is to minimize the area 210. Thus, a geometric error is minimized instead of an algebraic error. This leaves the processed images with much less distortion.

Figure 3:
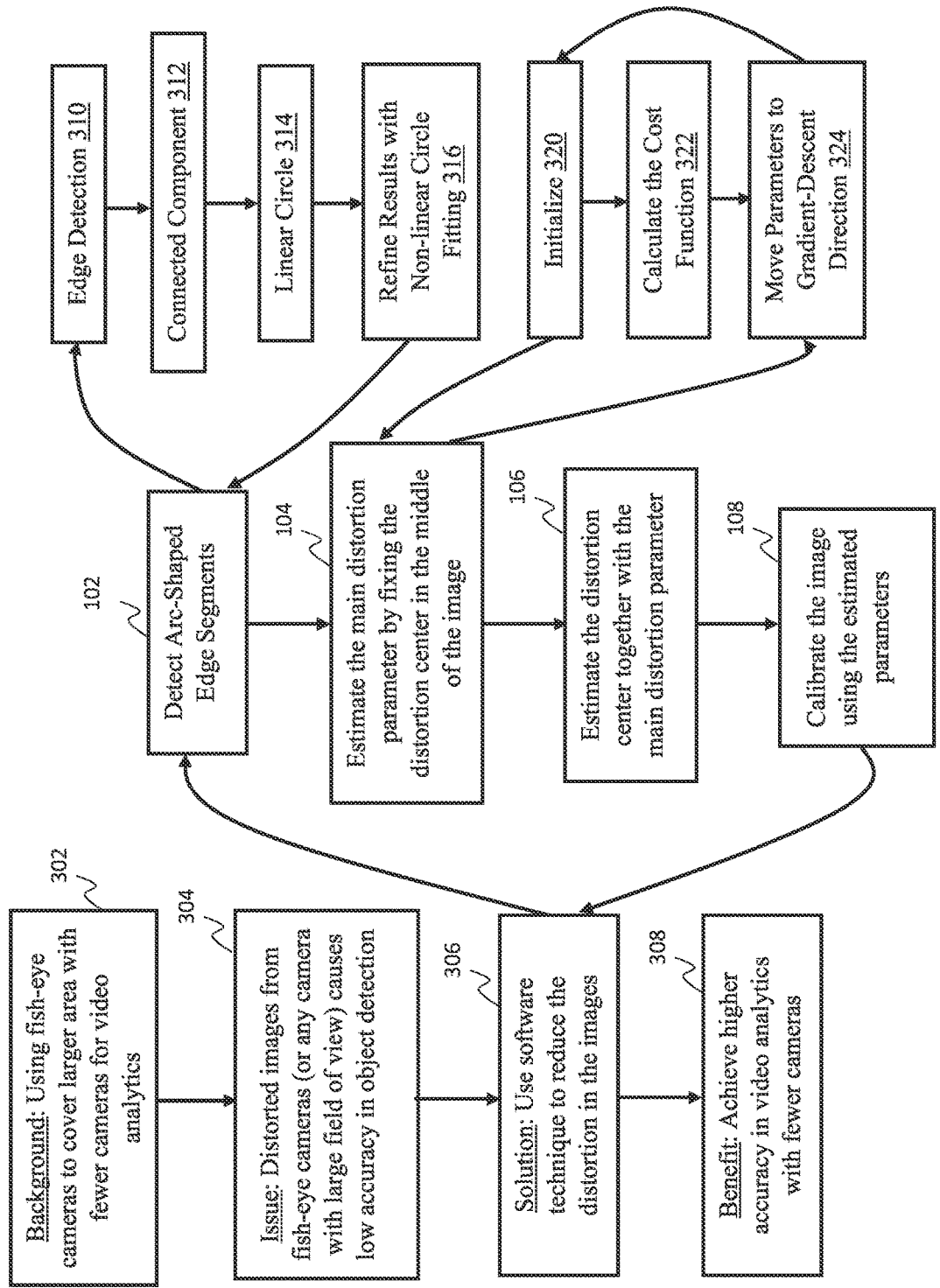
FIG. 3 is a block/flow diagram illustrating automatic fisheye camera calibration, in accordance with embodiments of the present invention.

FIG. 3 is a block/flow diagram illustrating automatic fisheye camera calibration, in accordance with embodiments of the present invention.

At block 302, fish-eye cameras are used to cover larger areas with fewer cameras for video analytics.

At block 304, distorted images from fish-eye cameras (or any camera with large field of view) cause low accuracy in object detection.

At block 306, a software technique in accordance with the exemplary embodiments is used to reduce the distortion in the images.

At block 308, the benefits of the exemplary methods are the achievement of higher accuracy in video analytics with fewer cameras.

As noted above, the exemplary technique at block 306 includes blocks 102, 104, 106, 108, described above with reference to FIG. 1.

Block 102 includes an edge detection component 310, a connected component 312, a linear circle 314, and a results refinement component 316 where the results are refined with non-linear circle fitting.

Block 104 includes an initialization step 320, a cost function calculation step 322, and a parameter movement step 324 where the parameters are moved to a gradient-descent direction.

At block 102, circles are used instead of the connected edge segments that yield a simpler and more efficient implementation.

At blocks 104, 106, the problem is formulated as a nonlinear optimization procedure based on the geometric error. Conventional art employs closed form formulas to compute the distortion parameters (distortion center coordinates and distortion coefficient) as a result of an algebraic minimization procedure. On the contrary, the exemplary embodiments employ a geometric error minimization instead of using an iterative scheme.

Therefore, the way the exemplary embodiments minimize the distortion error is unique and advantageous compared to previous works. For example, previous works proposed modelling the arcs as small, connected line segments. Then a line fitting process was performed by finding an average line that minimizes the total distance between the connected line segments to the average line. A minimization procedure is then based on minimizing this total distance by a nonlinear optimization procedure. The exemplary approach is unique in such a way that the exemplary methods make use of circles (not connected line segments). The error is then calculated using the area between each individual arc and its chord instead of using an average line. The exemplary embodiments also have a normalization step (that is, dividing the enclosed area by the length of the chord) to make sure that minimization does not go in a direction to shorten the length of the lines.

Therefore, in summary, the exemplary method is simpler and can be efficiently implemented to perform quick calibration within seconds. The exemplary embodiments assume that straight lines are mapped into circular arcs since fisheye cameras have barrel-type distortion that allows the exemplary methods to detect the circular arcs that are to be lines in an undistorted image. Thus, the exemplary methods can find radial distortion parameters and undistort images in footage captured by a camera by using only one image.

Figure 4:
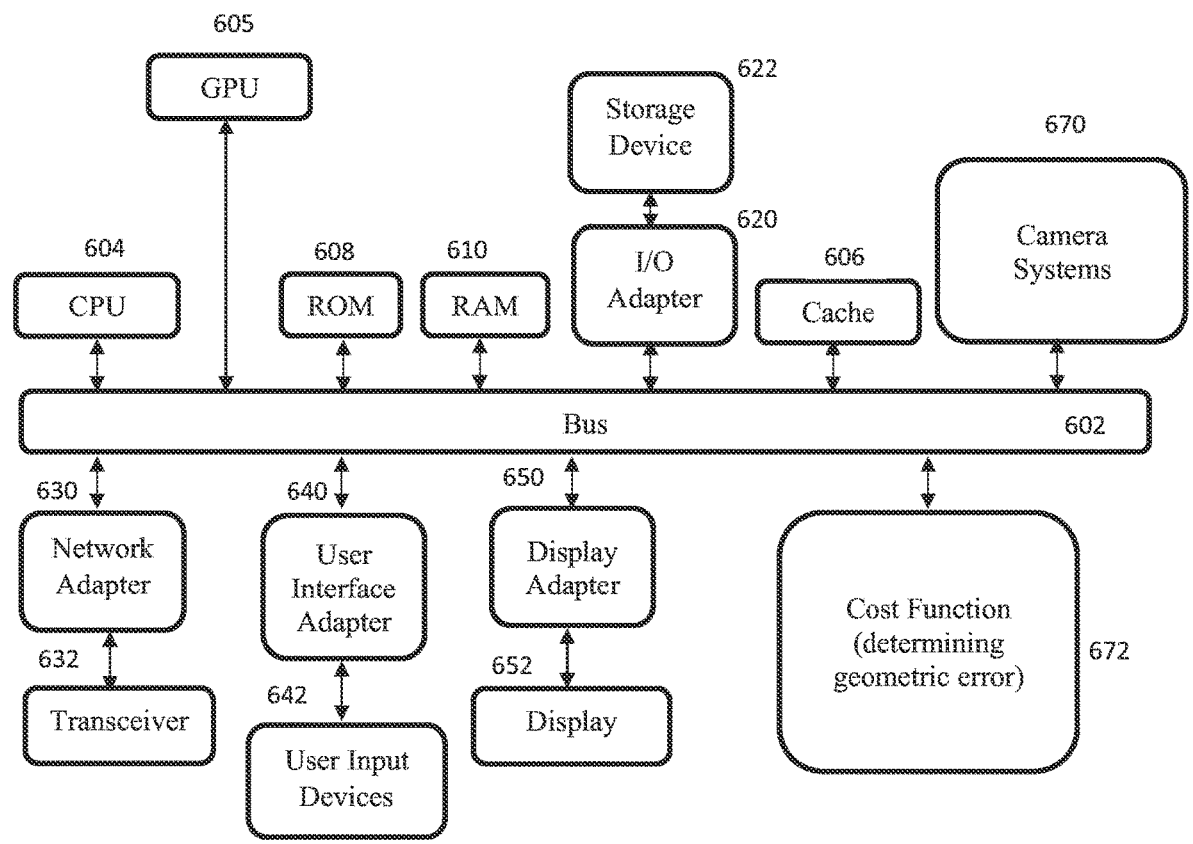
FIG. 4 is an exemplary processing system for automatic fisheye camera calibration for video analytics, in accordance with embodiments of the present invention.

FIG. 4 is an exemplary processing system for automatic fisheye camera calibration for video analytics, in accordance with embodiments of the present invention.

The processing system includes at least one processor (CPU) 604 operatively coupled to other components via a system bus 602. A GPU 605, a cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, camera systems 670 can be employed executing the cost function 672 to minimize or eliminate distortions from fisheye images.

A storage device 622 is operatively coupled to system bus 602 by the I/O adapter 620. The storage device 622 can be any of a disk storage device (e.g., a magnetic or optical disk storage device), a solid-state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 5:
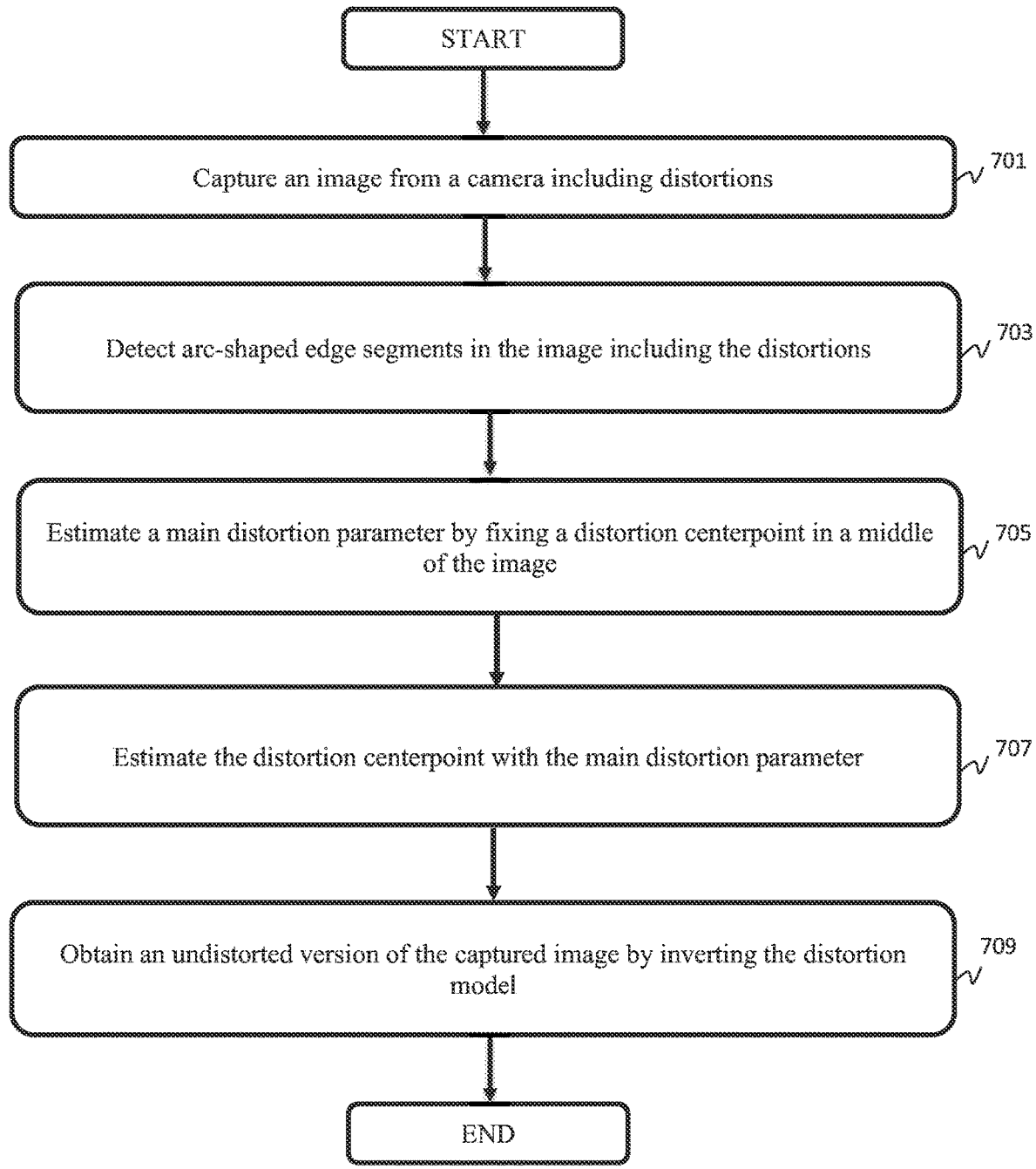
FIG. 5 is a block/flow diagram of a method for automatic fisheye camera calibration for video analytics, in accordance with embodiments of the present invention.

FIG. 5 is a block/flow diagram of a method for automatic fisheye camera calibration for video analytics, in accordance with embodiments of the present invention.

At block 701, capture an image from a camera including distortions.

At block 703, detect arc-shaped edge segments in the image including the distortions.

At block 705, estimate a main distortion parameter by fixing a distortion centerpoint in a middle of the image.

At block 707, estimating the distortion centerpoint with the main distortion parameter.

At block 709, obtain an undistorted version of the captured image by inverting the distortion model.

FIG. 6 is an equation for a cost function 800 for automatic fisheye camera calibration for video analytics, in accordance with embodiments of the present invention.

Figure 7:
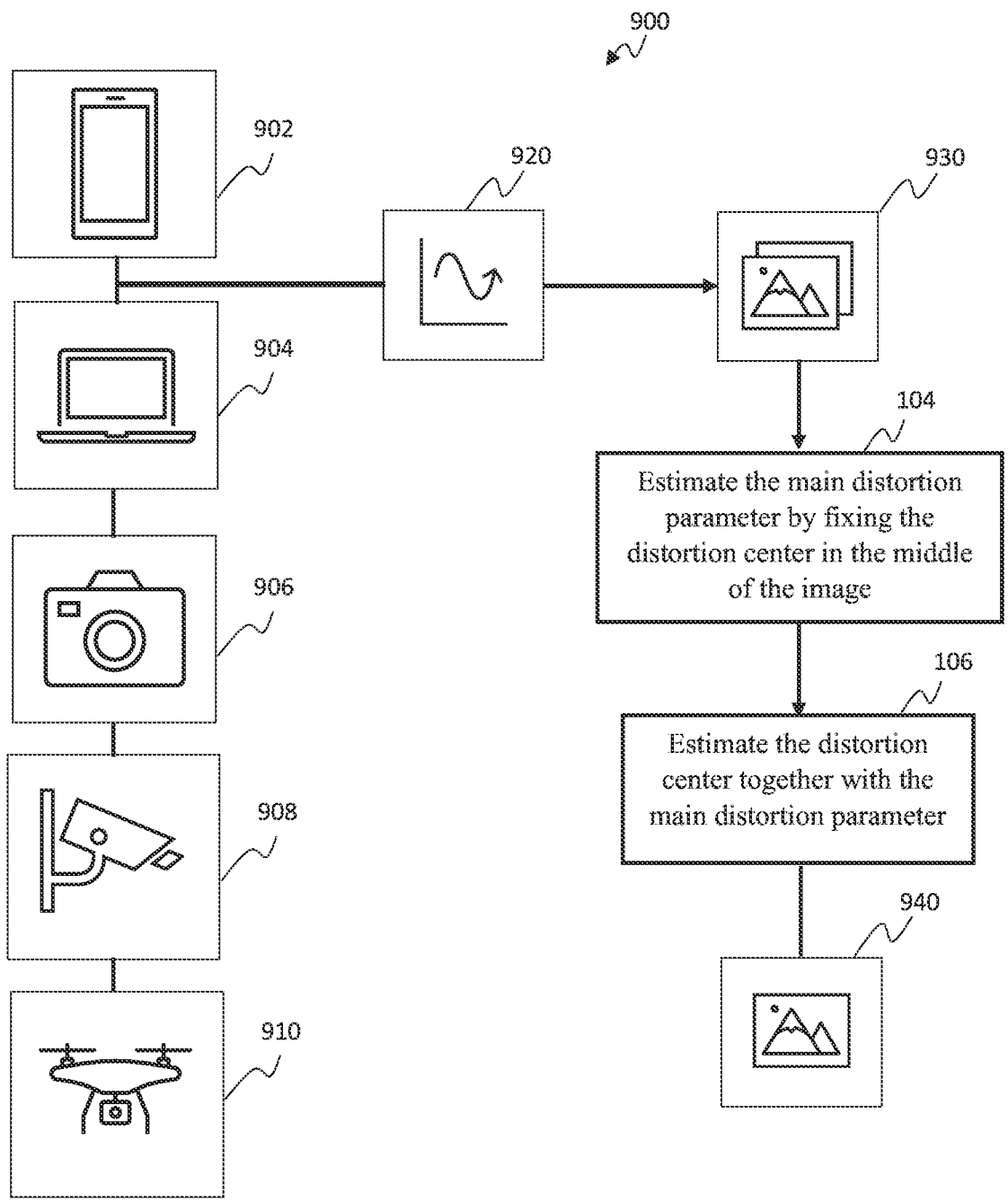
FIG. 7 is a block/flow diagram of practical applications for automatic fisheye camera calibration for video analytics, in accordance with embodiments of the present invention.

FIG. 7 is a block/flow diagram 900 of practical applications for automatic fisheye camera calibration for video analytics, in accordance with embodiments of the present invention.

Mobile phones 902, tablets 904, cameras 906, 908, and drones 910, to name a few electronic devices, can include a camera or image capturing device or component, which capture images. The captured images can be fisheye images 930 that include distortions. However, by applying the cost function 920 of the present invention the fisheye images 930 can be modified to undistorted images 940 by applying the estimation steps 102, 104 detailed above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed by at least one processor for reducing radial distortion errors in fish-eye images, the method comprising:
   capturing an image from a camera including distortions;
   detecting arc-shaped edge segments in the image including the distortions;

estimating a main distortion parameter by fixing a distortion centerpoint in a middle of the image;
estimating the distortion centerpoint with the main distortion parameter; and
obtaining an undistorted version of the captured image by inverting the distortion model,
wherein the undistorted version of the captured image is obtained by minimizing a geometric error.

2. The method of claim 1, wherein an area defined between a detected arc-shaped edge segment and a corresponding straight line segment or chord passing through both ends of the detected arc-shaped edge segment is minimized.

3. The method of claim 2, wherein the area defined between the detected arc-shaped edge segment and the chord is a cost function.

4. The method of claim 3, wherein the cost function is given as:

$$E = \sum_{k=1}^{N} \left| \sum_{j=1}^{n_k} \frac{f(x_j, y_j; \lambda, x_o, y_o)}{d_k} \right|$$

where N is a number of circular arcs in the image, $n_k$ is a number of pixels for $k_{th}$ arc, $d_k$ is a distance between the endpoints of $k_{th}$ arc, and $f(x_j, y_j, \lambda, x_o, y_o)$ is a signed distance between a point $(x_j, y_j)$ and the chord under a set of distortion parameters of $(\lambda, x_o, y_0)$.

5. The method of claim 3, wherein, for each detected arc-shaped segment, a distance sum is divided by a length of the chord to obtain a normalized error between each detected arc-shaped segment and its corresponding chord, the distance sum defined as a sum of point-line distances for each detected arc-shaped segment.

6. The method of claim 1, wherein the main distortion parameter is estimated by running an optimization procedure to obtain an optimum main distortion parameter value.

7. A system for applying rolling shutter (RS)-aware spatially varying differential homography fields for simultaneous RS distortion removal and image stitching, the system comprising:
a memory; and
a processor in communication with the memory, wherein the processor runs program code to:
capture an image from a camera including distortions;
detect arc-shaped edge segments in the image including the distortions;
estimate a main distortion parameter by fixing a distortion centerpoint in a middle of the image;
estimate the distortion centerpoint with the main distortion parameter; and
obtain an undistorted version of the captured image by inverting the distortion model,
wherein the undistorted version of the captured image is obtained by minimizing a geometric error.

8. The system of claim 7, wherein an area defined between a detected arc-shaped edge segment and a corresponding straight line segment or chord passing through both ends of the detected arc-shaped edge segment is minimized.

9. The system of claim 8, wherein the area defined between the detected arc-shaped edge segment and the chord is a cost function.

10. The system of claim 9, wherein the cost function is given as:

$$E = \sum_{k=1}^{N} \left| \sum_{j=1}^{n_k} \frac{f(x_j, y_j; \lambda, x_o, y_o)}{d_k} \right|$$

where N is a number of circular arcs in the image, $n_k$ is a number of pixels for $k_{th}$ arc, $d_k$ is a distance between the endpoints of $k_{th}$ arc, and $f(x_j, y_j, \lambda, x_o, y_o)$ is a signed distance between a point $(x_j, y_j)$ and the chord under a set of distortion parameters of $(\lambda, x_o, y_o)$.

11. The system of claim 9, wherein, for each detected arc-shaped segment, a distance sum is divided by a length of the chord to obtain a normalized error between each detected arc-shaped segment and its corresponding chord, the distance sum defined as a sum of point-line distances for each detected arc-shaped segment.

12. The system of claim 7, wherein the main distortion parameter is estimated by running an optimization procedure to obtain an optimum main distortion parameter value.

13. A non-transitory computer-readable storage medium comprising a computer-readable program for applying rolling shutter (RS)-aware spatially varying differential homograph); fields for simultaneous RS distortion removal and image stitching, wherein the computer-readable program when executed on a computer causes the computer to perform the steps of:
capturing an image from a camera including distortions;
detecting arc-shaped edge segments in the image including the distortions;
estimating a main distortion parameter by fixing a distortion centerpoint in a middle of the image;
estimating the distortion centerpoint with the main distortion parameter; and
obtaining an undistorted version of the captured image by inverting the distortion model,
wherein the undistorted version of the captured image is obtained by minimizing a geometric error.

14. The non-transitory computer-readable storage medium of claim 13, wherein an area defined between a detected arc-shaped edge segment and a corresponding straight line segment or chord passing through both ends of the detected arc-shaped edge segment is minimized.

15. The non-transitory computer-readable storage medium of claim 14, wherein the area defined between the detected arc-shaped edge segment and the chord is a cost function.

16. The non-transitory computer-readable storage medium of claim 15, wherein the cost function is given as:

$$E = \sum_{k=1}^{N} \left| \sum_{j=1}^{n_k} \frac{f(x_j, y_j; \lambda, x_o, y_o)}{d_k} \right|$$

where N is a number of circular arcs in the image, $n_k$ is a number of pixels for $k_{th}$ arc, $d_k$ is a distance between the endpoints of $k_{th}$ arc, and $f(x_j, y_j, \lambda, x_o, y_o)$ is a signed distance between a point $(x_j, y_j)$ and the chord under a set of distortion parameters of $(\lambda, x_o, y_o)$.

17. The non-transitory computer-readable storage medium or claim 15, wherein, for each detected arc-shaped segment, a distance sum is divided by a length of the chord to obtain a normalized error between each detected arc-shaped segment and its corresponding chord, the distance sum defined as a sum of point-line distances for each detected arc-shaped segment.

18. The non-transitory computer-readable storage medium of claim 13, wherein the main distortion parameter is estimated by running an optimization procedure to obtain an optimum main distortion parameter value.

\* \* \* \* \*